Dec. 18, 1934.  A. P. BOUCHER  1,984,358
SHEARS
Filed April 14, 1932  2 Sheets-Sheet 1

Inventor,
Albert P. Boucher,
by Roberts Cushman & Woodberry
Att'ys.

Dec. 18, 1934.  A. P. BOUCHER  1,984,358
SHEARS
Filed April 14, 1932  2 Sheets-Sheet 2
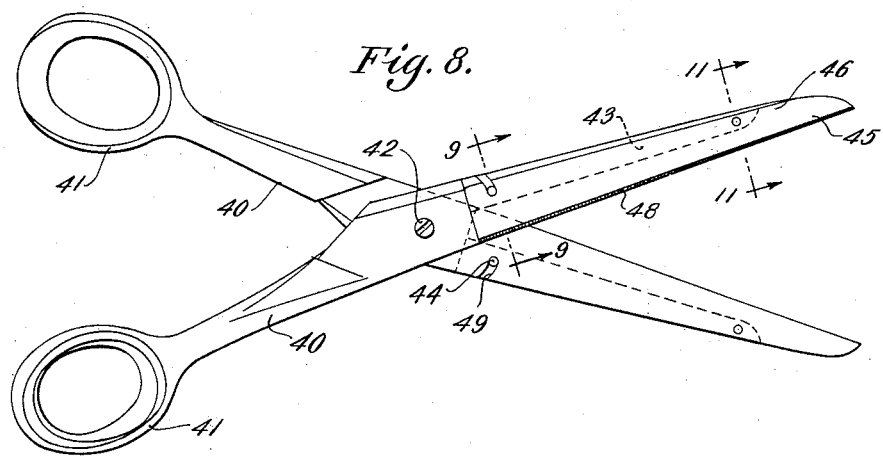
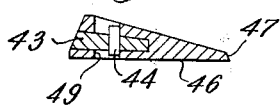
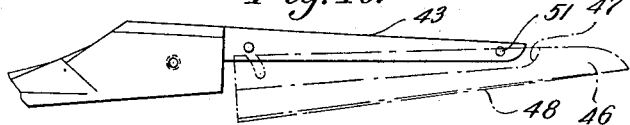
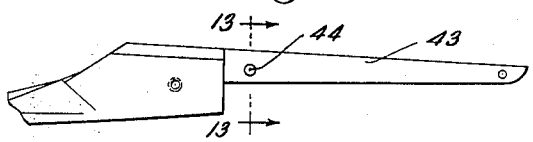
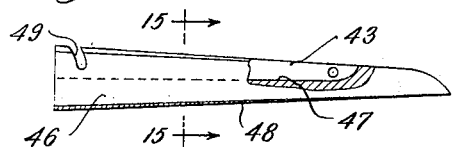
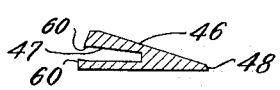
Inventor,
Albert P. Boucher,
by
Att'ys.

Patented Dec. 18, 1934

1,984,358

UNITED STATES PATENT OFFICE 1,984,358

SHEARS

Albert P. Boucher, Portsmouth, N. H.

Application April 14, 1932, Serial No. 605,149

9 Claims. (Cl. 30—13)

This invention relates to a cutting device of the general type having coacting blades movable toward and away from each other to sever material such, for example, as a pair of hand shears adapted for general or specific uses. The present invention particularly provides coacting blade members with detachable or inserted cutting elements which may be removed and replaced when desired.

Heretofore it has been customary to manufacture shears from less expensive materials such as cast steel and to harden the cutting edges to obtain the necessary wear-resisting properties. Shears made in this manner have not been satisfactory as the hardened metal may vary in physical characteristics and soft spots are likely to occur in the cutting edges, at least after a few sharpenings thereof, due to the slight depth of the hardened portion of the metal.

The present invention permits the employment of cutting elements which avoid these objections and permits the ready replacement of the cutting elements when desired. These cutting elements may be formed of the highest grade steel suitable for the purpose without requiring the shears to be unduly costly. This invention particularly permits the securing of the cutting elements to the blade members in such a manner that the parts are firmly held together in use and yet may readily be separated when desired. The invention avoids the necessity of employing small more or less undependable parts such as small clamping screws, spring clips and the like, but the resiliency of the cutting elements and/or blade members may cooperate with the particular shapes afforded thereto to afford an effective interfitting engagement therebetween. Thus, this invention avoids objectionable characteristics of prior attempts to make shears with detachable cutting elements.

Figure 5:
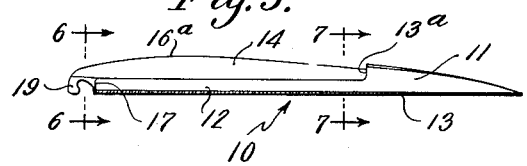
Fig. 5 is a plan view of a cutting element.
Figure 6:
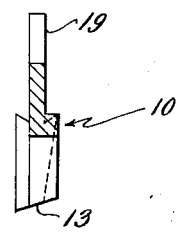
Figure 7:
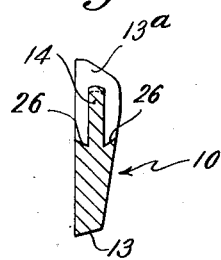

Figs. 6 and 7 are sections indicated by lines 6—6 and 7—7 of Fig. 5.

Fig. 8 is a plan view of shears with an optional arrangement of the blade members and cutting elements;

Fig. 9 is a section indicated by line 9—9 of Fig. 8;

Fig. 10 is a plan view of a part of the shears shown in Fig. 8, the cutting element being indicated by dot and dash lines and shown in a partially detached position;

Fig. 11 is a section indicated by line 11—11 of Fig. 8;

Fig. 12 is a plan view of a blade member;

Fig. 13 is a section indicated by line 13—13 of Fig. 12;

Fig. 14 is a broken plan view of a cutting member; and

Fig. 15 is a section indicated by line 15—15 of Fig. 14.

Referring first to the embodiment of the invention illustrated in Figs. 1 to 7 of the accompanying drawings, it is evident that my cutting device may comprise two blade members 1 and 2, the blade member 1 being provided with a handle or end loop 3, and the blade member 2 having a similar handle 4, which may be provided with a finger piece 5. Aside from the handle portions the blade members may be of similar form and the subsequent description thereof may be equally applicable to both of the cooperating members.

A pivot pin or screw 6 pivotally secures the blade members together and they are provided with outwardly extending shank portions 8 which terminate in end surfaces 16 substantially at right angles to the direction of extent of the corresponding blade members. Each shank portion 8 is provided with a groove 9, the open side of which may be disposed substantially midway of the inner edges of the opposite wider faces of the blade members and parallel to the inner face which slides over that of the other blade member. This slot receives a cutting element 10. The element 10 may be provided with a pointed end portion or tip 11 and an elongate body portion 12 extending along groove 9, a shoulder 13ª being afforded to engage the end surface 16 of the corresponding blade shank 8.

Fig. 5 illustrates more in detail the shape of the cutting element 10, the body portion 12 and the pointed tip 11 cooperating to provide a continuous beveled cutting edge 13, the thickness of the portion 11 and the part of portion 12 adjoining the cutting edge being substantially the same as that of the adjoining blade member. Behind this relatively thick part of the body portion 12 is a thinner tongue section 13 which is received within the groove 9. As shown, the inner wall of groove 9 may have a gradual concave curvature away from its ends and a complementarily formed curved edge 16ª may be provided upon the tongue of the cutting element. The body portion of the cutting element is extended to provide a hook 19 of the general shape shown in Figs. 2 and 5. The hook 19 is adapted to fit tightly against a pin 20 extending into the groove of the shear member (Fig. 4) and preferably permanently secured thereto.

Figure 1:
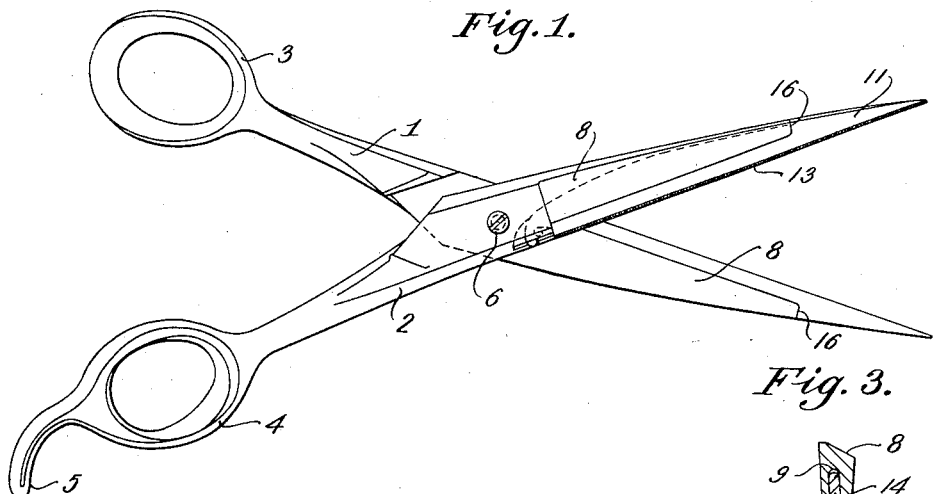
Fig. 1 is a plan view of a pair of shears formed in accordance with this invention.
Figure 3:
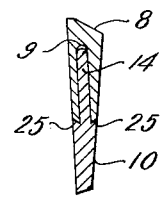
Fig. 3 is a section indicated by line 3—3 of Fig. 2.
Figure 2:
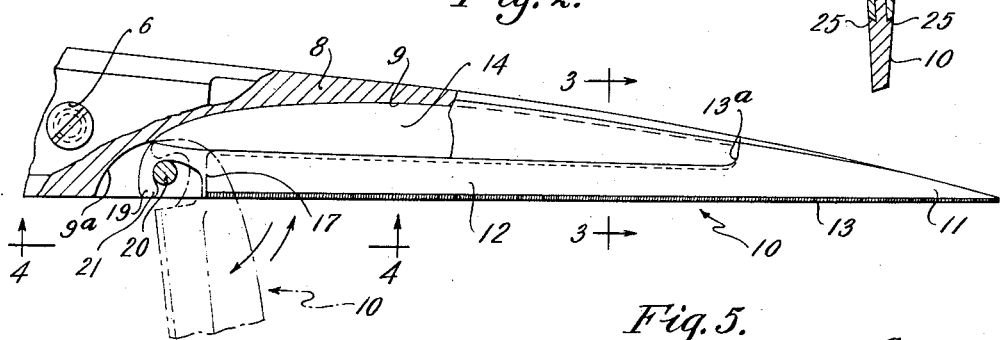
Fig. 2 is a broken plan view of a portion of the shears shown in Fig. 1, one position of the cutting element being indicated by dot and dash lines.

When the blade member and cutting element are in their operative relation, the cutting element is in the position shown in full lines in Fig. 2 with its curved edge 16ª engaging the correspondingly curved inner wall of groove 9 and with the hook 19 pressing against the pin 20 in the general direction of the adjoining inner end or corner of cutting edge 13. The hook is provided with a slightly enlarged end portion 21 to aid in the firm engagement of the parts. The groove 9 is provided with an extension 9ª to accommodate the hook 19 and to permit its movement so that the cutting element may be removed. The inner wall of the groove 9 and its extension 9ª may have such a curvature or form as to permit the ready employment of conventional milling elements in producing the blade member.

Figure 4:
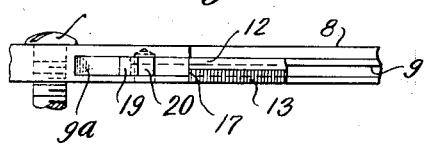
Fig. 4 is an edge elevation of a portion of the blade assembly shown in Fig. 2.

Preferably the metal of the member 10 surrounding the hook element 19 is made somewhat thicker than the tongue 14 and somewhat thinner than the portion of the cutting element adjoining the open side of slot 9; accordingly slot extension 9ª has a greater width than slot 9 and a shoulder 17 is afforded on element 10 adjoining the hook 19 (Figs. 4, 5 and 6). The sides of groove 9 preferably are so formed that the cutting element is gripped, due to the resiliency of the walls of the groove, and to assist in this gripping action the edges of the blade member 8 at each side of the groove preferably are beveled, as designated by numeral 25, so that these edge surfaces incline away from the mouth of the groove toward the back of the blade. The cutting member 10 preferably is provided with similar complementarily beveled surfaces 26 (Fig. 7) which are adapted to engage the beveled edge portions of the blade member, thus tending to force the outer portions of the walls of the groove inwardly upon the tongue 13 to enhance the natural gripping action of the blade member.

Furthermore, the shoulder 13ª of the cutting element engages the end surface 16 of the blade member so that the cutting element 10 may be removed from the blade shank 8 by a relative tilting between the element and member, and it may be returned to its operative position by a reversed movement, as indicated by the curved arrows of Fig. 2, the tilting or swinging of the member and element substantially comprising a movement about the pin 20 as an axis with a slight inward movement of the hooked end of the cutting element at the outer end of its path, so that the enlargement 21 readily passes the pin 20.

Figs. 8 to 15 illustrate an optional embodiment of the invention wherein the cutting elements are provided with grooves to receive the shanks of the blade members, the relative interlocking engagement between these parts, however, being of the same general type as that already described.

Shears or scissors of the type disclosed in Fig. 8 may have similar blade members 40 with looped handle portions 41 and a pivotal connection 42. The shanks 43 of the blade members are preferably relatively short as well as small in cross section and are provided with pins 44 spaced from their inner ends and outer edges. A cutting member 46 to be employed with blade members of this type may have a pointed end portion or tip 45 and be provided with a longitudinal groove 47, the outer end of which is curved so that the pointed extremity 45 of the blade is of substantially solid cross section. The groove 47 is shaped to receive the shank 43 of the blade member. For this purpose the blade member preferably may have a slightly tapered cross section, its thinnest edge being inwardly adjoining the cutting edge 48 of the cutting element 46 and its thicker edge being at the back of the blade. The slot 47 formed in the cutting element may be of substantially uniform thickness, i. e., may have parallel walls, but the walls of the groove, rather than being exactly parallel, may have their outer portions slightly inturned, as shown in Fig. 15, and designated by numeral 60, and the shank 43 may have a corresponding shape so that its thickest cross section is spaced inwardly from its back edge. Thus, a snapping engagement of the blade member over the back edge (Fig. 13) or marginal portion of the shank may be afforded. Furthermore, when engaging the blade member the metal of the cutting element is distorted to afford a firm gripping effect, even in its normal position, while the outer end of the groove is shaped to engage the curved outer end of the shank 43.

A curved slot 49 preferably is provided in each wall of the groove 47 to engage the pin 44, the slots extending in a direction which is substantially defined by a portion of the arc of the circle drawn around the pin 42 as a center. In order to assist in the firm retention of the cutting element upon the blade member, the element may be provided with inwardly pressed or protuberant portions 50 which engage in complementary recesses or depressions 51 in the opposite faces of the shank 43 of the blade member.

When the embodiment of the invention illustrated in Figs. 8 to 15 is employed, the blade and cutting element may be separated by a relative movement therebetween which is illustrated by the dotted line position of Fig. 10, the blade being slightly tilted and slid laterally so that the pin 44 may move relatively to the slot 49. The blades 46 may be manufactured of high quality tempered steel which has the inherent resilience which permits the firm engagement of the parts in the manner described.

It is evident that in both embodiments of the invention there is an engagement of a shank portion of the blade member with the cutting element, this engagement being of the tongue and groove type and arranged so that the parts may be separated by a relative tilting movement parallel to the plane of the relative movement of the blade members about their pivotal connection. Furthermore, the arrangement of the end portion of the blade in engagement with a shoulder upon the shank is analogous in both embodiments of the invention.

A cutting device of the general character disclosed herein may be manufactured with cutting elements of extremely high quality so that sharpening or replacement need take place only at infrequent intervals. During use the cutting elements are held in firm interengagement with the blade members. The ready detachment of the parts may be effected to permit replacement of the cutting elements by the proper relative movement between the parts and without necessity of removing or loosening of special fastening elements and without the necessity of depending upon small spring clips or the like.

It should be understood that the present disclosure is for the purpose of illustration only and that this invention includes all modifications and equivalents which fall within the scope of the appended claims.

I claim:

1. A cutting device of the class described comprising a pair of blade members, a pivotal connection therebetween, each of said blade members having a longitudinal groove therein, the groove of one member opening toward the other member, a removable cutting element associated with each of said blade members, each cutting element having a relatively thin tongue portion adapted to be received in interfitting relation with the groove of the blade member, and pin and recess means provided by each blade member and cutting member to aid the interfitting engagement of the same, each cutting member having a tip portion and a body portion relatively thicker than the tongue portion, said tip portion having a planar shoulder shaped to engage the end of the shank of a blade member.

2. A cutting device of the class described comprising a pair of blade members, a pivotal connection therebetween, each of said blade members having a longitudinal groove therein, a pair of cutting elements, each of said elements having an integral tongue portion shaped to be received in resilient interengagement with the groove of one of said blade members, the cutting element also having a tip portion with a shoulder shaped to engage the end of the blade member and with an elongate body portion affording an extension of the tip portion and cooperating therewith to provide a cutting surface, an extension of the body portion remote from the tip portion affording a hook, a continuation of said groove affording a recess and a part within said recess to engage said hook, said hook having a thickness greater than that of the tongue portion and less than that of said body portion, and said extension of the groove having a width greater than that of the major portion of the groove, the blade member having beveled surfaces adjoining the open side of the groove and inclined away from the same, the cutting element having complementary beveled surfaces arranged to press against the beveled surfaces of the blade member and cause it to grip said tongue portion, whereby the cutting element is secured to the blade due to the resilient interengagement of the tongue portion and groove, the engagement of the shoulder and end of the blade member, the engagement of said hook and part and the engagement of said beveled surfaces.

3. A cutting device of the class described comprising a pair of blade members, a pivotal connection therebetween, each of said blade members having a longitudinal groove therein, a pair of cutting elements, each of said elements having an integral tongue portion shaped to be received in resilient interengagement with the groove of one of said blade members, the cutting element also having a thicker tip portion with a shoulder having a substantially planar abutment surface to engage the end of the blade member, each cutting element also having an elongate body portion affording an extension of its tip portion and cooperating therewith to provide a cutting edge, an extension of the body portion remote from the tip portion affording a hook, a continuation of said groove affording a recess, and a part within said recess to engage said hook, each blade member having beveled surfaces adjoining the open side of the groove and inclined away from the same, each cutting element having complementary beveled surfaces arranged to press against the beveled surfaces of the blade member and cause it to grip said tongue portion in response to pressure upon the cutting edge, said hook being shaped to permit the movement of the cutting element into engagement with the blade by a substantially pivotal movement about said part as a center and thus being effective to cause relative movement of the abutment surface and end of the blade, substantially at right angles to the cutting edge as the cutting element is finally moved into interengagement with the blade.

4. A cutting device of the class described comprising a pair of blade members, a pivotal connection therebetween, each of said blade members having a longitudinal groove therein, a pair of cutting elements, each of said elements having an integral tongue portion shaped to be received in resilient interengagement with the groove of one of said blade members, the cutting element also having a thicker tip portion with a shoulder having a substantially planar abutment surface to engage the end of the blade member, each cutting element also having an elongate body portion affording an extension of a tip member and cooperating therewith to provide a cutting edge, each blade member having beveled surfaces adjoining the open side of the groove and inclined away from the same, each cutting element having complementary beveled surfaces arranged to press against the beveled surfaces of the blade member and cause it to grip said tongue portion in response to pressure upon the cutting edge.

5. A cutting device of the class described comprising a pair of blade members, a pivotal connection therebetween, each of said blade members having a longitudinal groove therein, a pair of cutting elements, each of said elements having an integral tongue portion shaped to be received in resilient interengagement with the groove of one of said blade members, the cutting element also having a thicker tip portion with a shoulder having a substantially planar abutment surface to engage the end of the blade member, said cutting element also having an elongate body portion affording an extension of a tip member and cooperating therewith to provide a cutting edge, an extension of the body portion remote from the tip portion affording a hook, a continuation of said groove affording a recess and a part within said recess to engage said hook, said hook member having an end with a curved inner surface to engage said part and to guide the cutting element into engagement with the blade by a substantially pivotal movement about said part as a center and thus being effective to cause relative movement of the abutment surface and end of the shank, substantially at right angles to the cutting edge as the cutting element is moved into firm interengagement with the blade.

6. A cutting device of the class described comprising a blade member having a longitudinal groove therein, a cutting element having an integral tongue portion shaped to be received in resilient interengagement with said groove, the cutting element also having a tip portion with a shoulder providing a substantially planar abutment surface to engage the end of the blade member, the cutting element also having an elongate body portion affording an extension of its tip portion and cooperating therewith to provide a cutting edge, an extension of the body portion remote from the tip portion having a hook-like shape and being in interfitting engagement with a recess provided by a continuation of said groove, the blade member having beveled surfaces adjoining the open side of the groove and inclined away from the same, the cutting element having complementary beveled surfaces arranged to press against the beveled surfaces of the blade member and cause it to grip said tongue portion in response to pressure upon the cutting edge, said extension of the cutting element and the cooperating recess of the blade member being shaped to permit the movement of the cutting element into engagement with the blade by a substantially pivotal movement about said extension as a center, and thus being effective to cause relative movement of the abutment surface and the end of the blade substantially at right angles to the cutting edge as the cutting element is finally moved into interengagement with the blade.

7. A cutting device of the class described comprising a blade member having a longitudinal groove therein, a cutting element having an integral tongue portion shaped to be received in resilient interengagement with said groove, the cutting element having a thicker tip portion with a shoulder having a substantially continuous abutment surface to engage the end of the blade member, the cutting element also having an elongate body portion affording an extension of its tip portion and cooperating therewith to provide a cutting edge, the blade member having beveled surfaces adjoining the open side of the groove and inclined away from the same, the cutting element having complementary beveled surfaces arranged to press against the beveled surfaces of the blade member and cause it to grip said tongue portion in response to pressure upon the cutting edge, whereby the cutting element is firmly held in place.

8. A cutting device of the class described comprising a blade member having a longitudinal groove therein, a cutting element having an integral tongue portion shaped to be received in resilient interengagement with the groove of said blade member, the cutting element having an elongate body portion providing a cutting edge and a substantially round extension of the body portion, a complementary recess in the blade member receiving said extension, said recess and extension cooperating substantially to define a pivotal axis about which one end of the blade member may swing so that the tongue may move into and out of the groove, the blade member having beveled surfaces adjoining the open side of the groove and inclined away from the same, the cutting element having complementary beveled surfaces arranged to press against the beveled surfaces of the blade member, whereby the blade member may firmly grip said tongue in response to pressure upon the cutting edge.

9. A cutting device of the class described comprising a blade member having a longitudinal groove therein, a cutting element having a body portion providing a cutting edge and having an integral tongue extending from its opposite edge, said tongue being thinner than said body portion and being received in said groove of the blade member, the blade member having beveled surfaces adjoining the open side of the groove and inclined away from the side, the cutting element having complementary beveled surfaces normally pressing against the beveled surfaces of the blade member to cause it to grip said tongue portion, the pressure with which the blade member grips the tongue portion being automatically increased in response to cutting pressure upon the cutting edge.

ALBERT P. BOUCHER.